March 10, 1931.  E. R. GURNEY  1,795,428
STEERING KNUCKLE
Filed Feb. 11, 1928
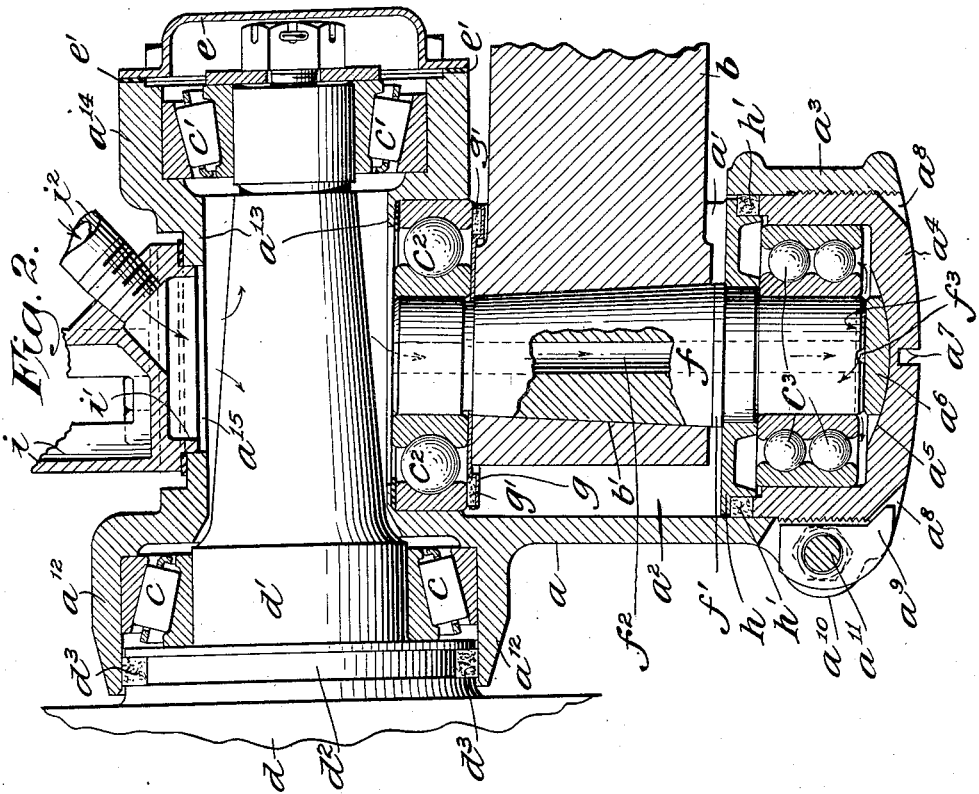
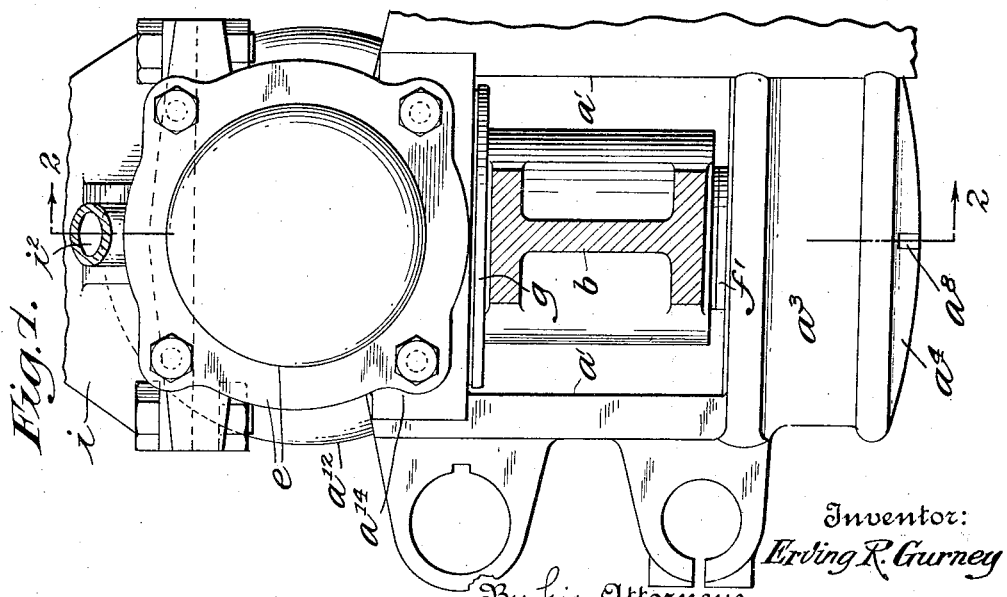
Inventor:
Erving R. Gurney
By his Attorneys
Redding, Greeley, O'Shea & Campbell Patented Mar. 10, 1931

1,795,428

UNITED STATES PATENT OFFICE

ERVING R. GURNEY, OF NEW YORK, N. Y., ASSIGNOR TO INTERNATIONAL MOTOR COMPANY, OF NEW YORK, N. Y., A CORPORATION OF DELAWARE

STEERING KNUCKLE

Application filed February 11, 1928. Serial No. 253,562.

Steering knuckles have been designed to provide center point steering with a straight knuckle pin. These designs have avoided, in so far as possible, any overhang of the wheel with respect to the axis of the knuckle pin. Where the wheel spindle is journaled in a knuckle pin, outwardly of the axle, the plane of the wheel is extended considerably beyond the axis of the knuckle pin and the extremity of the axle. Certain forms of steering knuckles have utilized a straight knuckle pin journaled in the extremity of the axle and carrying a knuckle having a longitudinal housing for the wheel spindle above the upper extremity of the knuckle pin. This shifts the plane of the wheel near the axle and enables the steering of the vehicle to be bettered considerably.

The present invention relates to steering knuckles of the latter type, which are journaled upon straight knuckle pins and carry the wheel spindle in a longitudinal housing above the pin. More specifically, the invention resides in the provision of an improved form of knuckle which facilitates the lubrication of all of the bearings associated therewith and provides a thrust bearing in the bottom of the steering knuckle structure which receives and distributes the thrust of the vehicle load upon the knuckle more effectively.

In accordance with the above, an object of this invention is to provide a steering knuckle which may be lubricated at a single point conveniently located thereon, the structure being such that the lubricant is carried to all of the bearings associated with the knuckle. The knuckle, being sealed at all of the bearings, prevents leakage of the lubricant from the interior thereof.

Another object of the invention is to provide a thrust bearing in the knuckle to receive the thrust of the knuckle pin which carries the load of the vehicle.

Further objects will appear as the description proceeds and reference will now be had to the accompanying drawings, wherein:

Figure 1 is an end view, in a plane through the axle, of the improved knuckle construction.

Figure 2 is a view, in section, taken on line 2—2 of Figure 1 and looking in the direction of the arrows.

Referring to the drawings, $a$ designates a steering knuckle provided at one side with an opening $a'$ to receive an axle $b$ of a vehicle. The interior of the knuckle is hollow as at $a^2$ in order that the axle extremity and knuckle pin may be received therein. The lower extremity of the knuckle is formed with a hollow cylindrical portion $a^3$, interiorly threaded and receiving a cap $a^4$ which is screwed thereinto.

The cap $a^4$ is formed with a spherical bearing surface $a^5$ upon which is carried a button $a^6$ having a cooperating spherical bearing surface to engage the bearing surface $a^5$. Groove $a^7$ in the cap $a^4$ provides a means for threading it into the cylindrical portion $a^3$ and diametrically spaced slots $a^8$, cooperating with dog $a^9$ afford a means for locking the cap in a desired position. The dog $a^9$ may be secured in position by clamping it between nibs $a^{10}$ by bolt $a^{11}$.

At its upper extremity, the knuckle is provided with a cup-shaped flange $a^{12}$ for receiving bearings $c$ between the wheel spindle $d'$ and the knuckle. The wheel $d$ is formed with a groove $d^2$ which carries packing $d^3$ to engage the outer extremity of the cup-shaped flange $a^{12}$. This serves to seal the bearing $c$ and prevent lubricant from escaping. Longitudinal housing $a^{13}$ is formed in the knuckle above the cavity $a^2$ and receives the wheel spindle $d$. On the opposite side of the knuckle from the cup-shaped flange $a^{12}$, is formed a second enlarged cylindrical flange $a^{14}$ to receive the bearing $c'$ at the extremity of the wheel spindle. Cap $e$ and a gasket $e'$ are secured to the extremity of the cylindrical flange $a^{14}$ and serve to seal the knuckle at this point.

The axle $b$ is formed with a tapered bearing $b'$ which receives a correspondingly tapered knuckle pin $f$. At its upper end, the knuckle pin is mounted in a bearing $c^2$ which is sealed by means of disc $g$ and packing $g'$, thus preventing the escape of lubricant from the knuckle at this point. The knuckle pin rests upon the button $a^6$ and lateral movement of the lower extremity thereof with respect to the knuckle is resisted by the bearing $c^3$, carried between the lower extremity of the knuckle pin and the cap $a^4$. A shoulder $f'$ on the knuckle pin engages a disc $h$ to cause it to confine packing $h'$ between it and the cap $a^4$ and cylindrical portion $a^3$ of the knuckle pin. This seals the bearing $c^3$ and prevents the escape of lubricant from the knuckle through such bearing.

At the top of the knuckle, and communicating with the housing $a^{13}$, a recess $a^{15}$ is formed. Bracket $i$, for mounting the brake, is formed with a downwardly extending flange $i'$ for engaging and closing the aperture $a^{15}$. Pipe fitting $i^2$ in this bracket serves as a means for introducing lubricant into the interior of the knuckle. The knuckle pin is formed with an axial hollow portion $f^2$ and radial grooves $f^3$ adjacent the button $a^6$ which communicate with the hollow portion $f^2$. It will be seen that lubricant supplied through the pipe fitting $i^2$ will be forced through the knuckle and to all of the bearings carried thereby. The housing $a^{13}$ will permit the lubricant to be supplied to the bearings $c$ and $c'$ as well as the bearing $c^2$, while the hollow knuckle pin will carry lubricant to the thrust bearing and bearing $c^3$. The thrust bearing $a^6$ is automatically self-aligning and serves to improve the steering qualities of the knuckle quite materially.

Although the invention has been described in connection with the specific form of knuckle shown in the accompanying drawings, it is not to be limited, save as defined in the appended claims.

I claim as my invention:

1. In a steering knuckle and knuckle pin, a hollow cylindrical portion formed on the knuckle, an aperture in the knuckle above the cylindrical portion to receive the end of an axle, a bearing carried by the cylindrical portion to support the knuckle pin and a hollow portion in the knuckle above the aperture and forming a cylindrical chamber to receive a wheel spindle.

2. In a steering knuckle and knuckle pin, a hollow cylindrical portion formed on the knuckle, an aperture in the knuckle above the cylindrical portion to receive the end of an axle, a hollow portion in the knuckle above the aperture and forming a cylindrical chamber to receive a wheel spindle, a cap removably secured in the cylindrical portion of the knuckle, a thrust bearing between the pin and cap, and a cylindrical flange on the cap carrying a radial bearing for the lower end of the knuckle pin.

This specification signed this 3rd day of February, A. D., 1928.

ERVING R. GURNEY.